United States Patent [19]

Faulstich et al.

[11] 3,898,093

[45] Aug. 5, 1975

[54] HIGHLY REFRACTING OPTICAL GLASS FOR CORRECTION OF HIGH DIOPTER VALUES WITH LOW DENSITY

[75] Inventors: Marga Faulstich; Volkmar Geiler; Georg Gliemeroth, all of Mainz; Lothar Meckel, Ostrich, all of Germany

[73] Assignee: Jenaer Glaswerk Schott & Gen., Mainz, Germany

[22] Filed: Nov. 30, 1973

[21] Appl. No.: 420,369

[30] Foreign Application Priority Data

Dec. 2, 1972 Germany............................ 2259183

[52] U.S. Cl. ................................................. 106/54
[51] Int. Cl. ............................................. C03c 3/08
[58] Field of Search .............................. 106/47 Q, 54

[56] References Cited
UNITED STATES PATENTS

| | | | |
|---|---|---|---|
| 3,266,916 | 8/1966 | Bromer et al. | 106/54 |
| 3,477,863 | 11/1969 | Bromer et al. | 106/54 |
| 3,615,770 | 10/1971 | Faulstich et al. | 106/54 X |
| 3,703,389 | 11/1972 | Bromer et al. | 106/47 Q |
| 3,740,242 | 6/1973 | Faulstich et al. | 106/47 Q X |

FOREIGN PATENTS OR APPLICATIONS

| | | | |
|---|---|---|---|
| 1,496,556 | 9/1972 | Germany | 106/47 Q |
| 1,941,374 | 2/1971 | Germany | 106/47 Q |

*Primary Examiner*—Allen B. Curtis
*Assistant Examiner*—Thomas A. Waltz
*Attorney, Agent, or Firm*—Millen, Raptes & White

[57] ABSTRACT

An optical quality glass suitable for use in eyeglass lenses, characterized by having a refractive index $n_d$ of at least 1.70; a specific gravity of not more than 3.0 and a thermal coefficient of expansion $\alpha \times 10^7$ per °C of not more than 100, which contains at least 90 mol % of metal oxide components having a molecular weight of not more than 100, and which consists essentially of at least 90 mol % of $SiO_2$, $B_2O_3$, $Li_2O$, $Na_2O$, $K_2O$, $M_aO$, $CaO$, $ZnO$, $TiO_2$ and a crystallization stabilizing amount of up to about 10 mol % of at least one member selected from the group consisting of $SrO$, $BaO$, $ZrO_2$, $Ta_2O_5$ and $Nb_2O_5$.

6 Claims, No Drawings

3,898,093

HIGHLY REFRACTING OPTICAL GLASS FOR CORRECTION OF HIGH DIOPTER VALUES WITH LOW DENSITY

BACKGROUND OF THE INVENTION

The invention relates to optical glass compositions having a relatively high refractive index of at least 1.70 and a relatively low cgs density or specific gravity ($s$) of at most 3.0. Highly refracting optical glasses heretofore have been offered on the eyeglass market and used for spectacle glasses with high diopter values, but such glasses have relatively high specific gravities above 3.7, e.g., Schott BaF 50, $s = 3.8$; Schott SF 15, $s=4.06$ g/cm$^3$ and the like.

In order to achieve a high refractive index $\eta d$ of 1.70 or higher together with low nu values $\nu$, e.g., of 35 or less in optical quality silicate glasses suitable for eyeglass lenses, it has generally been thought necessary to utilize flint- or bariumflint-glass compositions containing a high heavy metal-oxides content, e.g., of lead- and/or barium,-/and lanthanoxide which has resulted in high densities of 3.7 and higher.

For diopters of ~–8 to –25, these prior art spectacle glasses require very large rim thicknesses, for diopters >+8 require very large center thicknesses and have relatively high weights; this is a great disadvantage from both the aesthetic and practical points of view.

The physical and chemical properties required of optical quality glass for use as eyeglass lenses are well established in the art. For example, such glasses must not only be optically clear and free from imperfections but should exhibit a small thermal expansion coefficient $\alpha \times 10^7$ per °C at 20°–300 °C of 85 – 100; they should be capable of being pressed to facilitate manufacture of lens blanks,. The glass preferably has a sufficiently high content of smaller alkali metals, especially Na, to permit chemical hardening by ion exchange with larger alkali metals in compliance with the FDA test guideline.

Furthermore, the glasses must be chemically inert, non-toxic and free of optical defects.

The new glasses have a high E-modulus of ~9,500 kp/mm$^2$, and, therefore, have a higher strength than the usual, comparable flint glasses the E-modulus of which is ~6,100 kp/mm$^2$.

OBJECTS OF THE INVENTION

Accordingly, it is a general object of this invention to provide highly refractive optical quality glass which is substantially lighter in weight than those presently commercially available.

Another object of this invention is to provide highly refractive, lightweight eyeglass lenses.

A further object of this invention is to provide a glass having these properties which can be fused with common optical quality crown glasses so as to form achromatic doublet lenses.

An additional object of this invention is to provide such optical quality glasses which are easily processable into eyeglass lenses.

Upon further study of the specification and appended claims, further objects and advantages of this invention will become apparent to those skilled in the art.

SUMMARY OF THE INVENTION

Briefly, the above and other objects are attained in one aspect of the present invention by providing an optical quality glass suitable for use in eyeglass lenses, characterized by having a refractive index $\eta d$ of at least 1.70; a specific gravity of not more than 3.0 and a thermal coefficient of expansion $\alpha \times 10^7$ per °C of not more than 100, which contains at least 90 mol % of metal oxide components having a molecular weight of not more than 100, and which consists essentially of at least 90 mol % of SiO$_2$, B$_2$O$_3$, Li$_2$O, Na$_2$O, K$_2$O, MgO, CaO, ZnO TiO$_2$ and a crystallization stabilizing amount of up to about 10 mol % of at least one member selected from the group consisting of SrO, BaO, ZrO$_2$, Ta$_2$O$_5$ and Nb$_2$O$_5$, said glass being further characterized by consisting essentially of, in parts by weight per 100 parts of glass:

a. 40–45 wt % SiO$_2$ and 2–6 wt % B$_2$O$_3$, the total SiO$_2$ and B$_2$O$_3$ being 42–49 wt %;
b. 12–17 wt % total Li$_2$O, Na$_2$O and K$_2$O, including 6–16 wt % Na$_2$O;
c. 24–26 wt % TiO$_2$; and
d. 2–7 wt % ZrO$_2$.

DETAILED DISCUSSION

The glasses of the present invention, which consist essentially of at least 90 mol % of SiO$_2$-B$_2$O$_3$-alkali metal oxides-MgO-CaO-ZnO-TiO$_2$ and not more than 10 mol % of SrO-BaO-ZrO$_2$-Al$_2$O$_3$-La$_2$O$_3$-Nb$_2$O$_5$-Ta$_2$O$_5$, have the following properties:

a. Refractive index $\eta d \geq 1.70$, generally 1.70–1.71
b. Specific gravity (cgs) $\leq 3.0$, generally 2.9–3.0
c. Expansion coefficients $\alpha \cdot 10^7 \leq 100$ at 20–300°C, generally 85–100

The glasses according to the invention can d. optionally be fused with a spectacle crown glass of $\eta d = 1.523$, e.g., vd = 58.9
specific gravity (cgs) = 2.54
expansion coeff. $\alpha \times 10$ f/06 at 20°–300°C = 96
transformation temperature T$_R$(°C) = 540 e. are capable of being pressed by conventional techniques;
f. have a high E-modulus, e.g., of 9,400–9,600 kp/mm$^2$
g. can be chemically hardened, e.g., by ion exchange (the FDA test is met).

The glasses according to the invention consist essentially of SiO$_2$-B$_2$O$_3$-alkali metal oxides-ZrO$_2$-TiO$_2$ and can be crystallization-stabilized with a crystallization stabilizing amount of up to about 10 mol % of at least one member selected from the group consisting of CaO, MgO, SrO, BaO, ZnO, Al$_2$O$_3$, La$_2$O$_3$ Ta$_2$O$_5$ and Nb$_2$O$_5$.

The glasses according to the invention comprise at least 90 mol % of metal oxides which have a molecular weight not greater than 100.

The glasses advantageously have the following composition, in weight % of the total composition:

|  | Useful | Preferred |
| --- | --- | --- |
| SiO$_2$ | 40–45% | 41–44% |
| B$_2$O$_3$ | 2–6% | 2.5–5.0% |
| SiO$_2$ + B$_2$O$_3$ | 42–49% | 44–49% |
| Li$_2$O | 0–4% | 1–4%* |
| Na$_2$O | 6–16% | 6–14% |
| K$_2$O | 0–10% | 1–7%* |
| Total Alkali Metal Oxides | 12–17% | 12–17% |
| TiO$_2$ | 24–26% | 25% |
| ZrO$_2$ | 2–7% | 3–6% |
| CaO | 0–6% | 2–6%* |
| MgO | 0–4% | 0% |

-Continued

|  | Useful | Preferred |
|---|---|---|
| SrO | 0–10% | 3–4%* |
| BaO | 0–10% | 0–10% |
| ZnO | 0–7% | 1.5–6.5%* |
| $Al_2O_3$ | 0–2% | 0–1% |
| $La_2O_3$ | 0–5% | 0–5% |
| $Nb_2O_5$ | 0–5% | 1–3%* |
| $Ta_2O_5$ | 0–3% | 0–3% |

*optional ingredients; preferred range when present.

Up to 5 % of BeO and CdO can be introduced for further crystallization stabilization. Both components are, however, generally avoided for use in eyeglass lenses because of their toxicity.

$La_2O_3$ can be wholly or partially replaced by an equivalent molar quantity of $Y_2O_3$. Similarly, a part, e.g., 0 – 3 mol %, of the $SiO_2$ can be replaced by $GeO_2$. The cost of the raw materials for both replacement components is presently so high that they are economically not introduced. $Nb_2O_5$ can similarly be replaced by up to an equivalent molar quantity of $Ta_2O_5$. Again for reasons of economy, the total content of $Nb_2O_5$ and/or $Ta_2O_5$ should likewise be kept as small as possible.

For refining these glasses, an $As_2O_3$ content of 0.3 % is generally sufficient; however, depending on the method employed in producing the melt, a higher content of $As_2O_3$ or other conventional refining agents can be used, e.g., up to 1 %, as is known in the art.

The glasses have very good chemical stability, i.e., as proved by "Chemical Properties" - tests (Schott Optical Glass, catalogue No. 3060172 d IX 1720o.p.:
  a. Resistance to climatic variations — KWB class 1
  b. Resistivity to Staining — Staining class 0
  c. Acid resistance — Class 1–2
and can be ground and polished in the same way as conventional optical glasses.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees celsius; unless otherwise indicated, all parts and percentages are by weight.

Table 1 shows examples for glasses according to the invention in percentages by weight; Table 2 shows them in molar percentages.

TABLE 1

Glass Compositions in wt. %

| Metal Oxides | Example 1 | 2 | 3 | 4 | 5 | 6 | 7 | 8 | 9 |
|---|---|---|---|---|---|---|---|---|---|
| $SiO_2$ | 43.3 | 43.3 | 41.75 | 43.60 | 42.00 | 42.00 | 41.95 | 41.0 | 44.0 |
| $B_2O_3$ | 2.75 | 5.0 | 2.75 | 5.00 | 5.00 | 3.00 | 2.75 | 3.0 | 3.0 |
| $Li_2O$ | 1.00 | 2.4 | 1.00 | 2.40 | 4.00 | — | 1.00 | 1.0 | — |
| $Na_2O$ | 10.10 | 6.0 | 10.00 | 6.00 | 6.00 | 15.00 | 14.00 | 14.0 | 12.0 |
| $K_2O$ | 4.75 | 7.0 | 6.00 | 7.00 | 7.00 | — | 1.00 | 2.0 | — |
| CaO | 2.00 | 6.0 | 2.00 | 6.00 | 6.00 | — | — | 2.0 | 6.0 |
| SrO | 3.50 | — | 4.00 | — | — | — | 3.00 | 4.0 | — |
| BaO | — | — | — | — | — | 10.00 | — | — | — |
| ZnO | 1.50 | — | 1.50 | — | — | — | 6.20 | 2.0 | — |
| $Al_2O_3$ | — | 0.3 | — | — | — | — | — | — | 4.0 |
| $La_2O_3$ | — | — | — | — | — | — | — | — | 6.0 |
| $ZrO_2$ | 3.00 | 5.0 | 3.00 | 5.00 | 5.00 | 5.00 | 4.00 | 6.0 | 6.0 |
| $TiO_2$ | 25.10 | 25.00 | 25.00 | 25.00 | 25.00 | 25.00 | 25.10 | 25.0 | 25.0 |
| $Nb_2O_5$ | 3.00 | — | 3.00 | — | — | — | 1.00 | — | — |
| $n_d$ | 1.709 | 1.702 | 1.7042 | 1.700 | 1.707 | 1.702 | 1.705 | 1.705 | 1.7154 |
| $v_d$ | 30.0 | 31.2 | 30.5 | 31.5 | 31.5 | 30.7 | 30.2 | 31.0 | 30.3 |
| $s[g/cm^3]$ | 2.95 | 2.88 | 2.95 | 2.85 | 2.86 | 3.0 |  |  | 2.98 |
| $\alpha \cdot 10^7$ 20–300°C | 94 | 93 | 98 | 92 | 99 | 96 |  |  | 87.5 |

TABLE 2

Glass Compositions in mol %

| Metal Oxides | Example 1 | 2 | 3 | 4 | 5 | 6 | 7 | 8 | 9 |
|---|---|---|---|---|---|---|---|---|---|
| $SiO_2$ | 49.8 | 47.9 | 48.5 | 48.0 | 45.5 | 49.8 | 47.6 | 46.6 | 50.5 |
| $B_2O_3$ | 2.7 | 4.8 | 2.8 | 4.8 | 4.7 | 3.1 | 2.7 | 2.9 | 3.0 |
| $Li_2O$ | 2.3 | 5.3 | 2.3 | 5.3 | 8.7 | — | 2.3 | 2.3 | — |
| $Na_2O$ | 11.2 | 6.4 | 11.2 | 6.4 | 6.3 | 17.3 | 15.5 | 15.4 | 13.3 |
| $K_2O$ | 3.5 | 4.9 | 4.4 | 4.9 | 4.8 | — | 0.7 | 1.4 | — |
| CaO | 2.5 | 7.1 | 2.5 | 7.1 | 7.0 | — | — | 2.4 | 7.4 |
| SrO | 2.4 | — | 2.7 | — | — | — | 2.0 | 2.6 | — |
| BaO | — | — | — | — | — | 4.6 | — | — | — |
| ZnO | 1.3 | — | 1.3 | — | — | — | 5.2 | 1.7 | — |
| $Al_2O_3$ | — | 0.2 | — | — | — | — | — | — | — |
| $La_2O_3$ | — | — | — | — | — | — | — | — | — |
| $ZrO_2$ | 1.7 | 2.7 | 1.7 | 2.7 | 2.6 | 2.9 | 2.2 | 3.3 | 3.3 |
| $TiO_2$ | 21.8 | 20.7 | 21.8 | 20.8 | 20.4 | 22.3 | 21.5 | 21.4 | 21.7 |
| $Nb_2O_5$ | 0.8 | — | 0.8 | — | — | — | 0.3 | — | — |
| $n_d$ | 1.709 | 1.702 | 1.7042 | 1.700 | 1.707 | 1.702 | 1.705 | 1.705 | 1.7154 |
| $v_d$ | 30.0 | 31.2 | 30.5 | 31.5 | 31.5 | 30.7 | 30.2 | 31.0 | 30.3 |
| $s[g/cm^3]$ | 2.95 | 2.88 | 2.95 | 2.85 | 2.86 | 3.0 |  |  | 2.98 |
| $\alpha \cdot 10^7$ 20–300°C | 94 | 93 | 98 | 92 | 99 | 96 |  |  | 87.5 |
| Tg (°C) | 556 | 535 | 542 | 539 | 518 | 586 |  |  |  |

Further examples of optical glasses similar to those of the tables and within the scope of applicants' invention are as follows, in weight %:

| Example 10 | | Example 11 | |
|---|---|---|---|
| $SiO_2$ | 43.0 % | $SiO_2$ | 41.75% |
| $B_2O_3$ | 2.75% | $B_2O_3$ | 2.75% |
| $Li_2O$ | 1.0 % | $Li_2O$ | 1.0 % |
| $Na_2O$ | 10.0 % | $Na_2O$ | 14.0 % |
| $K_2O$ | 4.75% | $K_2O$ | 2.0 % |
| CaO | 2.0 % | ZnO | 3.5 % |
| SrO | 3.5 % | SrO | 4.0 % |
| ZnO | 1.5 % | $TiO_2$ | 25.0 % |
| ZrO | 3.5 % | $ZrO_2$ | 4.0 % |
| $TiO_2$ | 25.0 % | $Nb_2O_3$ | 1.0 % |
| $Nb_2O_5$ | 0.3 % | $As_2O_3$ | 0.3 % |
| $As_2O_3$ | 0.3 % | | |
| $n_d$ | 1.7089 | $n_d$ | 1.700 |
| $v_d$ | 30.1 | $v_d$ | 30.8 |
| $\alpha \times 10^7$ 20–300°C | 94 | $\alpha \times 10^7$ 20–300°C | 100 |
| Tg (°C) | 556 | Tg (°C) | 543 |
| s | 2.95 | s | 2.96 |

MELTING EXAMPLE FOR 150 KG OF GLASS

The raw materials of the following batch are weighed out:

| Oxides | % by Weight | Initial Materials | Weight Quantity in kg. |
|---|---|---|---|
| $SiO_2$ | 41.75 | $SiO_2$ | 62.72 |
| $B_2O_3$ | 2.75 | $H_3BO_3$ | 7.31 |
| $Li_2O$ | 1.00 | $Li_2CO_3$ | 3.72 |
| $Na_2O$ | 10.00 | $Na_2CO_3$ | 25.75 |
| $K_2O$ | 6.00 | $K_2CO_3$ | 13.26 |
| CaO | 2.00 | $CaCO_3$ | 5.37 |
| SrO | 4.00 | $Sr(NO_3)_2$ | 12.33 |
| ZnO | 1.50 | ZnO | 2.26 |
| $TiO_2$ | 25.00 | $TiO_2$ | 37.67 |
| $ZrO_2$ | 3.00 | $ZrO_2$ | 4.52 |
| $Nb_2O_5$ | 3.00 | $Nb_2O_5$ | 4.51 |
| $As_2O_3$ | 0.30 | $As_2O_3$ | 0.45 |

The batch is thoroughly mixed and melted at 1,400 ± 20°C in about 8 hours. After the melt has become clear, it is refined for 3 hours and stirred for 1 hour to the discharge temperature of 890°C. During discharge, the melt is worked into gobs or pressed elements. The batch can also be continuously melted in a trough. The glass has the following physical properties:

$\eta d = 1.7042$ ; $Vd = 30.5$
$\alpha \times 10^7/°C$ at (20–300°C) = 98 ; Tg (°C) = 542
s (g/cc) = 2.95

The proceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An optical quality glass suitable for use in eyeglass lenses, characterized by having a refractive index $\eta d$ of at least 1.70; a specific gravity of not more than 3.0 and a thermal coefficient of expansion $\alpha \times 10^7$ per °C of not more than 100, which contains at least 90 mol % of metal oxide components having a molecular weight of not more than 100, and which consists essentially of at least 90 mol % of $SiO_2$, $B_2O_3$, $Li_2O$, $Na_2O$, $K_2O$, $TiO_2$, MgO, CaO, ZnO and a crystallization stabilizing amount of up to about 10 mol % of at least one member selected from the group consisting of SrO, BaO, $ZrO_2$, $Ta_2O_5$ and $Nb_2O_5$, said glass being further characterized by consisting essentially of, in parts by weight per 100 parts of glass:

a. 40–45 wt % $SiO_2$ and 2–6 wt % $B_2O_3$, the total $SiO_2$ and $B_2O_3$ being 42–49 wt %;
b. 12–17 wt % total $Li_2O$, $Na_2O$ and $K_2O$, including 6–16 wt % $Na_2O$;
c. 24–26 wt % $TiO_2$; and
d. 2–7 wt % $ZrO_2$.

2. An optical glass according to claim 1, consisting essentially of, in % by weight of the total composition:

| | |
|---|---|
| $SiO_2$ | 40–45% |
| $B_2O_3$ | 2–6% |
| Total $SiO_2 + B_2O_3$ | 42–49% |
| $Li_2O$ | 0–4% |
| $Na_2O$ | 6–16% |
| $K_2O$ | 0–10% |
| Total Alkali Metal Oxides | 12–17% |
| $TiO_2$ | 24–26% |
| $ZrO_2$ | 2–7% |
| CaO | 0–6% |
| ZnO | 0–7% |
| MgO | 0–4% |
| SrO | 0–10% |
| BaO | 0–10% |
| $Al_2O_3$ | 0–2% |
| $La_2O_3$ | 0–5% |
| $Nb_2O_5$ | 0–5% |
| and $Ta_2O_5$ | 0–3%. |

3. An optical glass according to claim 2, having properties of

| | | |
|---|---|---|
| $n_d$ | = | 1.7042; |
| $v_d$ | = | 30.5; |
| $\alpha \times 10^7$ 20–300°C | = | 98; |
| $T_g$ (°C) | = | 542; and |
| s | = | 2.95, | consisting essentially of, in % by weight:

| | |
|---|---|
| $SiO_2$ | 41.75% |
| $B_2O_3$ | 2.75% |
| $Li_2O$ | 1.0% |
| $Na_2O$ | 10.0% |
| $K_2O$ | 6.0% |
| CaO | 2.0% |
| SrO | 4.0% |
| ZnO | 1.5% |
| $TiO_2$ | 25.0% |
| $ZrO_2$ | 3.0% |
| $Nb_2O_5$ | 3.0% |
| and $As_2O_3$ | 0.3%. |

4. An optical glass according to claim 2, having the properties of

| | | |
|---|---|---|
| $n_d$ | = | 1.7089; |
| $v_d$ | = | 30.1; |
| $\alpha \times 10^7$ 20–300°C | = | 94; |
| $T_g$ (°C) | = | 556; and |
| s | = | 2.95, | which optical glass consists essentially of, in % by weight,

| | |
|---|---|
| $SiO_2$ | 43.0% |
| $B_2O_3$ | 2.75% |
| $Li_2O$ | 1.0% |
| $Na_2O$ | 10.0% |
| $K_2O$ | 4.75% |
| CaO | 2.0% |
| SrO | 3.5% |
| ZnO | 1.5% |
| $ZrO_2$ | 3.5% |
| $TiO_2$ | 25.0% |
| $Nb_2O_5$ | 0.3% |
| and $As_2O_3$ | 0.3%. |

5. An optical glass according to claim 2, having the properties of $$n_d = 1.700;$$
$$v_d = 30.8;$$
$$\alpha \times 10^7 / 20\text{-}300°C = 100;$$
$$T_g (°C) = 543;$$
$$\text{density}(s, gm/cc) = 2.96,$$

which consists essentially of, in % by weight:

| | |
|---|---|
| $SiO_2$ | 41.75% |
| $B_2O_3$ | 2.75% |
| $Li_2O$ | 1.0% |
| $Na_2O$ | 14.0% |
| $K_2O$ | 2.0% |
| ZnO | 3.5% |
| SrO | 4.0% |
| $TiO_2$ | 25.0% |
| $ZrO_2$ | 4.0% |
| $Nb_2O_5$ | 1.0% |
| and $As_2O_3$ | 0.3%. |

6. The glass composition of claim 1 in the form of an eyeglass lens.

* * * * *